United States Patent [19]

Morrison, Jr. et al.

[11] Patent Number: 4,717,905
[45] Date of Patent: Jan. 5, 1988

[54] WARNING SYSTEM INCLUDING MEANS FOR REMOTELY ENERGIZING CONDITION SENSING DEVICE

[75] Inventors: Charles F. Morrison, Jr.; A. J. Mims, both of Boulder, Colo.

[73] Assignee: Roger W. Vernon, Georgetown, Colo.

[21] Appl. No.: 737,424

[22] Filed: May 24, 1985

[51] Int. Cl.$^4$ .................. B60C 23/06; B60C 23/02
[52] U.S. Cl. ........................ 340/58; 73/146.5; 200/61.25
[58] Field of Search .................. 340/58, 870.29; 250/231 R; 73/456, 705, 146.4, 146.5, 146.3, 146.2; 200/61.25

[56] References Cited

U.S. PATENT DOCUMENTS

| | | | |
|---|---|---|---|
| 3,593,269 | 7/1971 | Richardson | 340/58 |
| 3,697,944 | 10/1972 | Murano | 340/58 |
| 4,137,520 | 1/1979 | Deveau | |
| 4,180,794 | 12/1979 | Claxton | 340/58 |
| 4,319,220 | 3/1982 | Pappas et al. | 340/58 |
| 4,363,020 | 12/1982 | Venema | 340/58 |
| 4,376,931 | 3/1983 | Komatu et al. | 200/61.25 |
| 4,389,884 | 6/1983 | Aqulia | 340/58 |
| 4,567,460 | 1/1986 | Gebler | 73/146.5 |
| 4,578,992 | 4/1986 | Galasko et al. | 73/146.5 |
| 4,588,978 | 5/1986 | Allen | 340/58 |
| 4,609,905 | 9/1986 | Uzzo | 340/58 |

*Primary Examiner*—James L. Rowland
*Assistant Examiner*—Brent A. Swarthout
*Attorney, Agent, or Firm*—Gerald J. Ferguson, Jr.; Michael P. Hoffman; Michael J. Foycik, Jr.

[57] ABSTRACT

A system for monitoring a condition such as tire air pressure where the monitor at each tire is remotely energized by radio waves, there being two embodiments disclosed for effecting this. A loop antenna concentrically mounted with respect to each tire receiver and/or transmits electrical energy to the remote location which is typically at the operator's console. Each pressure sensitive device is mounted away from the valve stem and may include a strain gauge mounted on the tire side wall or between the wall and rim. An infrared detector may also be employed as a pressure monitoring device.

25 Claims, 8 Drawing Figures

WARNING SYSTEM INCLUDING MEANS FOR REMOTELY ENERGIZING CONDITION SENSING DEVICE

CROSS REFERENCE TO RELATED APPLICATION

This patent application is related to co-pending U.S. patent application Ser. No. 604,934 filed Apr. 27, 1984 in the name of Roger W. Vernon, this application being incorporated herein by reference.

BACKGROUND OF THE INVENTION

This invention relates to apparatus for monitoring a condition such as tire pressure including apparatus for remotely energizing the condition sensing apparatus.

In a tire pressure monitoring system, a pressure sensing device is typically disposed at each tire of the vehicle and a warning device is centrally located at the driver's console to provide a warning whenever the pressure at one or more of the tires deviates significantly from an established norm. Various arrangements are known for energizing the pressure monitoring device where typically a battery is provided at each tire. Other means are also known for energizing these devices such as those disclosed in U.S. Pat. Nos. 4,300,119 and 4,300,120 (where rotation of the tire is utilized to effect energization); U.S. Pat. No. 4,160,234 (where deflation of the tire is utilized); and U.S. Pat. No. 4,263,579 (where power obtained from the main storage battery of the vehicle is utilized). However, these devices are subject to various shortcomings.

Accordingly, it is a first primary object of this invention to provide means for energizing a condition sensing device such as a pressure transducer at a vehicle tire or the like where the requisite energy is transmitted via radio waves from an energy source disposed at the above-mentioned centrally located console or some other centrally located position.

Other tire pressure monitoring patents of interest are U.S. Pat. Nos. 4,048,614; 4,072,927; 4,137,520; 4,237,728; and 4,311,984. The foregoing patents together with the others mentioned above are incorporated herein by reference. The tire pressure monitoring systems disclosed in these patents have various shortcomings due to either the type of pressure transducing device employed or due to the location thereof.

Accordingly, it is a further primary object of this invention to provide improvements with respect to pressure transducing devices for use in monitoring tire pressure or the like, the improvements being with respect to the type of and/or location of the pressure transducer.

It is a further object of this invention to provide improved means for remote energizing a condition (not restricted to pressure) monitoring device.

Other objects and advantages of this invention will be apparent from a reading of the following specification and claims taken with the drawing.

DETAILED DESCRIPTION OF PREFERRED EMBODIMENTS OF THE INVENTION

Figure 1:
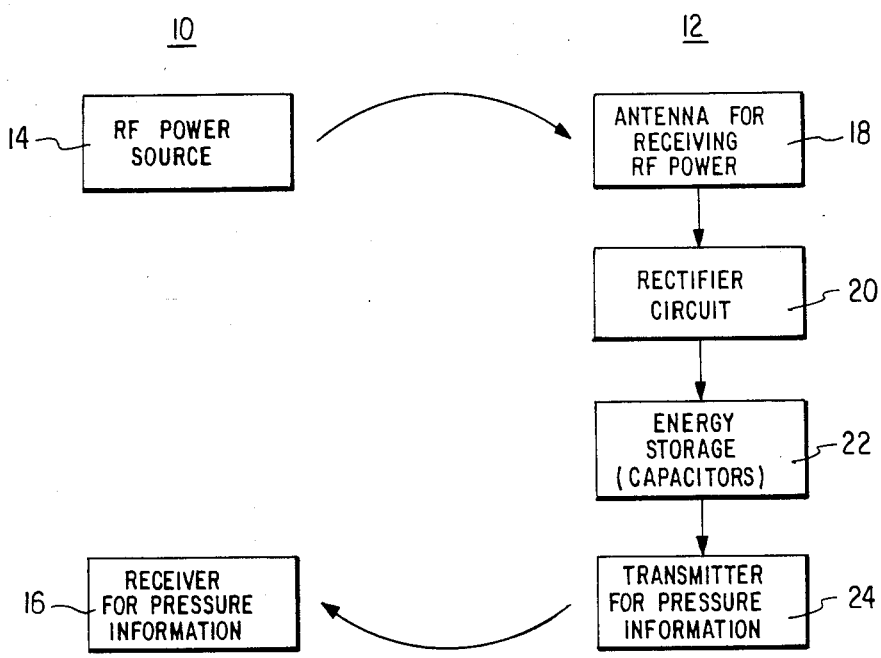
FIG. 1 is a block diagram of an illustrative system for remote energization of pressure transducing apparatus or the like located at one or more vehicle tires in accordance with the invention.

Referring to FIG. 1 there is illustrated at 10 the elements which would be disposed at a centrally located position such as the driver's console of a vehicle while at 12 there is illustrated the elements which would be located at each of the vehicle tires in accordance with a first tire pressure monitoring system of the invention. In particular, the central location may also be termed the receiver portion of the system since it receives tire status information transmitted from each of the tires while the monitoring circuitry at each of the tires may be termed the transmitting portion of the system. An RF power source 14 for radio transmitting RF power to each of the vehicle tires is employed in addition to a receiver 16 for receiving pressure information from the tires where the receiver may conventionally correspond to any one of the various receivers disclosed in the above-discussed patents or the above-mentioned co-pending application. At each tire is included an antenna 18, a rectifier circuit 20, an energy storage device 22 such as one or more capacitors, and a transmitter 24 for transmitting pressure information back to pressure information receiver 16. The transmitter 24 may also be of conventional construction such as is disclosed in any one of the above discussed patents or the above-mentioned co-pending application.

In operation, transmitter 24 is remotely energized from RF power source 14 in the following manner. The RF power transmitted from source 14 is received by antenna 18 as indicated by the arrow and is rectified by rectifier circuit 20 and then stored in capacitors 22. The energy stored in the capacitors is then applied to the transmitter to energize it for transmission of the requisite pressure information back to the receiver 16. As is known, the transmitter 24 will include a pressure transducing device which is sensitive to the tire pressure. When the tire pressure significantly deviates from a predetermined norm, this change in the pressure is transmitted back to receiver 16 to provide an appropriate alarm to the driver of the vehicle.

Figure 2:
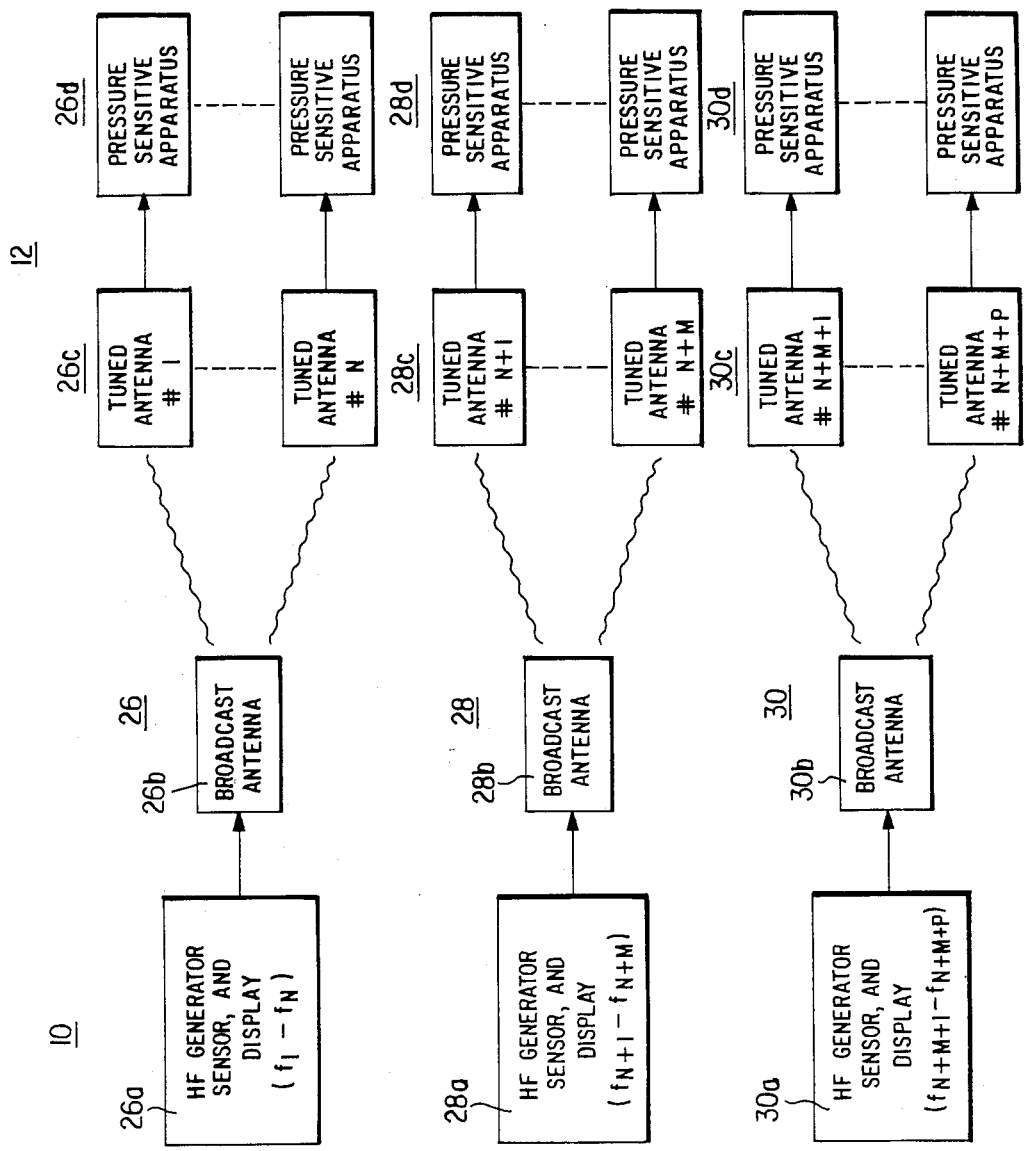
FIG. 2 is a block diagram of another illustrative system for remote energization of pressure transducing apparatus or the like in accordance with the invention.

Reference should now be made to FIG. 2 which illustrates another embodiment of the invention for remotely energizing the pressure transducer circuitry at the tires. In particular, at the centrally located portion 10 of the system, there are included in this example three channels, for example, 26, 28, and 30 where each channel is associated with a particular tire group. Thus, channel 26 may be associated with the front tires of a truck, channel 28 with the rear cab tires, and channel 30 with the trailer tires. Since each of the channels are the same including the operation thereof, except for possibly the number of tires included in a tire group, only the structure and operation of channel 26 will be generally described in FIG. 2 and more specifically described in FIG. 3. In FIG. 2, channel 26 includes a high frequency generator, sensor, and display 26a which generates and receives N signals where each of the signals is of a different frequency. These signals may be generated either sequentially or simultaneously and are applied to a broadcast antenna 26b for radio transmission to the tire monitoring devices located at 12. In channel 26 there are N tires in the tire group and at each tire there is located a tuned antenna 26c typically of high impedance. The output of each antenna 26c, is applied to and energizes an associated pressure monitoring apparatus 26d.

In operation, detection of a significant change in pressure at one of the tires, for example, the tire associated with tuned antenna no. 1, will cause a significant change in the impedance of the antenna. In the FIG. 3 embodiment of the invention, the impedance of the antenna effectively forms a part of the tuned circuit of generator 26a due to the coupling between broadcast antenna 26b and tuned antenna 26c and thus, the frequency of oscillation of the generator is changed in response to the change in impedance of the tuned antenna. The change in the frequency of oscillation is then sensed to actuate a display which provides a warning indication to the operator.

Figure 3:
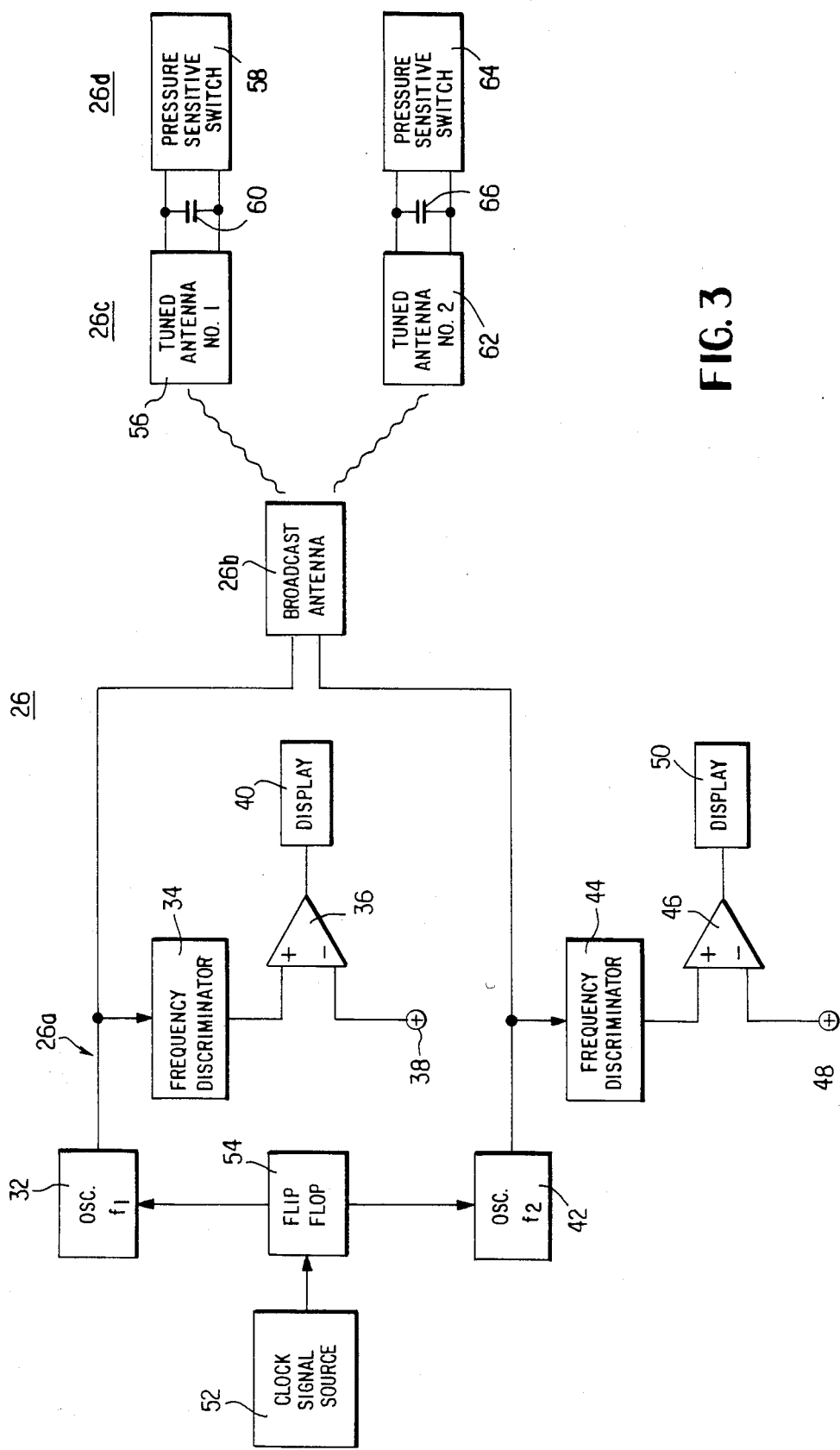
FIG. 3 is a block diagram of one channel of the system of FIG. 2.

Referring to FIG. 3, the high frequency generator, sensor, and display 26a of FIG. 2 includes (assuming there are only two channels) a first oscillator 32, which may be any conventional type of oscillator, which is typically operated at constant output power. Oscillator 32 generates a signal of frequency f1, this signal being applied to broadcast antenna 26b. Any change in the frequency of the oscillator is detected by a frequency discriminator 34, the output of which is applied to the + terminal of a comparator 36. Connected to the − terminal of the comparator is a reference voltage from a source 38. Whenever the output of the discriminator exceeds the reference voltage, the comparator provides a high level output to actuate display 40 and thus provide a warning to the operator of a dangerous condition at the tire associated with tuned antenna no. 1. Thus, the display not only provides an indication of the dangerous condition, but also indicates at what particular tire the dangerous condition exists.

Frequency generator, sensor, and display 26a also includes a second oscillator 42 which normally oscillates at a frequency f2 in response to a normal pressure condition at the tire associated with tuned antenna number 2. This oscillator is also connected to broadcast antenna 26b and to a frequency discriminator 44. The output of discriminator 44 is connected to a comparator 46 to which is also connected a reference voltage from a source 48, the output of the comparator being applied to a display 50.

Generator 26a also includes a clock signal source 52 which switches a flip-flop 54 between its respective states, the complementary outputs of the flip-flop being respectively applied to oscillators 32 and 42 to alternately actuate the oscillators. Thus, signals of frequencies f1 and f2 are alternately applied to tuned antenna no. 1 and tuned antenna no. 2. Circuitry connected to tuned antenna no. 1 (which is designated by reference numeral 56) includes a pressure sensitive switch 58 and a capacitor 60. Corresponding circuitry at the second tire includes tuned antenna no. 2 (which is designated by reference numeral 62), pressure switch 64, and capacitor 66.

Figure 5:
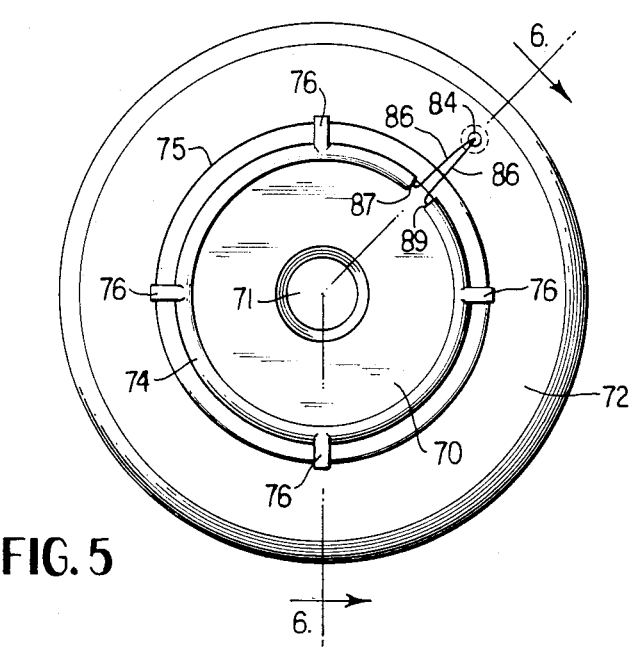
FIG. 5 is a side view of an antenna mounted on a vehicle wheel where the antenna may be used in the systems of FIGS. 1 and 2.
Figure 6:
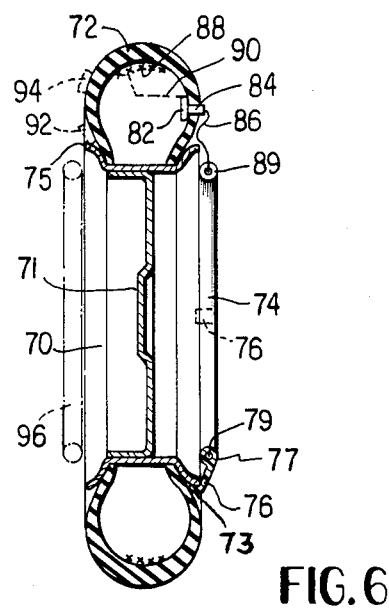
FIG. 6 is a cross-sectional view taken on the line 6—6 of FIG. 5.

In operation, assume the tire associated with tuned antenna 56 has its pressure drop sufficiently to trip pressure switch 58. This will short the tuned antenna. Thus, the high impedance of tuned antenna 56, which may typically comprises a parallel tank circuit including the inductance of a loop antenna (such as shown in FIGS. 5 and 6, as discussed below) and capacitor 60, will be significantly altered and thus, the frequency of oscillator 32 will also be altered as described above. This change in the frequency of the oscillator will be detected by discriminator 34 and the fact that the frequency change (or pressure drop) exceeds an acceptable tolerance as established by voltage source 38 will be detected by comparator 36 to actuate display 40 and alert the operator of the dangerous condition. It should be noted a series resonant circuit may also be employed as the tuned antenna. Moreover, the pressure switch may, instead of shorting the antenna, switch in other reactive components to change the resonant frequency of oscillator 32.

Since oscillators 32 and 42 are alternately actuated, all the tires included in channel 26 of FIG. 3 will be monitored and, if a dangerous condition occurs at any one of them, its corresponding display 40 or 50 will be actuated to alert the operator as to the existance and location of the dangerous condition.

In an alternative arrangement to FIG. 3, a single, variable frequency oscillator (not shown) could be used to scan the frequency spectrum containing each of the frequencies of the tuned antennas at the tires of a particular tire group. As long as the pressures at all the tires remain within the normal range, the pattern of the signal transmitted by the variable frequency oscillator would remain the same as detected, by example, a programmed microprocessor. However, whenever one or more of the tires has its pressure significantly changed from normal, there would be a change in the pattern of the generated signal which would be detected by the microprocessor to indicate not only the dangerous condition but also the tire at which the condition was occurring.

Moreover, the circuitry of FIG. 3 may, instead of being frequency sensitive, be amplitude sensitive. That is, rather than using a variable frequency, constant power oscillator as oscillator 32, a constant frequency, variable power oscillator may be employed, the frequency typically being crystal controlled. Moreover, rather than connecting frequency discriminator 34 to the output of oscillator 32, a rectifying circuit may be connected to one input of a comparator. Connected to the other imput of the comparator would be a reference voltage. The output of the rectifying circuit would be less than the reference voltage as long as the pressure at the tire associated with oscillator 32 remained normal. However, with a significant change in pressure at the tire and the subsequent changing of the tuned antenna impedance, the change of loading on the broadcast antenna 26b would result in a change in the output power level of the oscillator in order to maintain a constant voltage level at the broadcast antenna. Thus, the amplitude of the output signal from the rectifier would typically increase with a significant change in the pressure at the tire. Accordingly, a display connected to the output of the comparator would be actuated to provide an indication of the existence and location of the dangerous condition.

Figure 4:
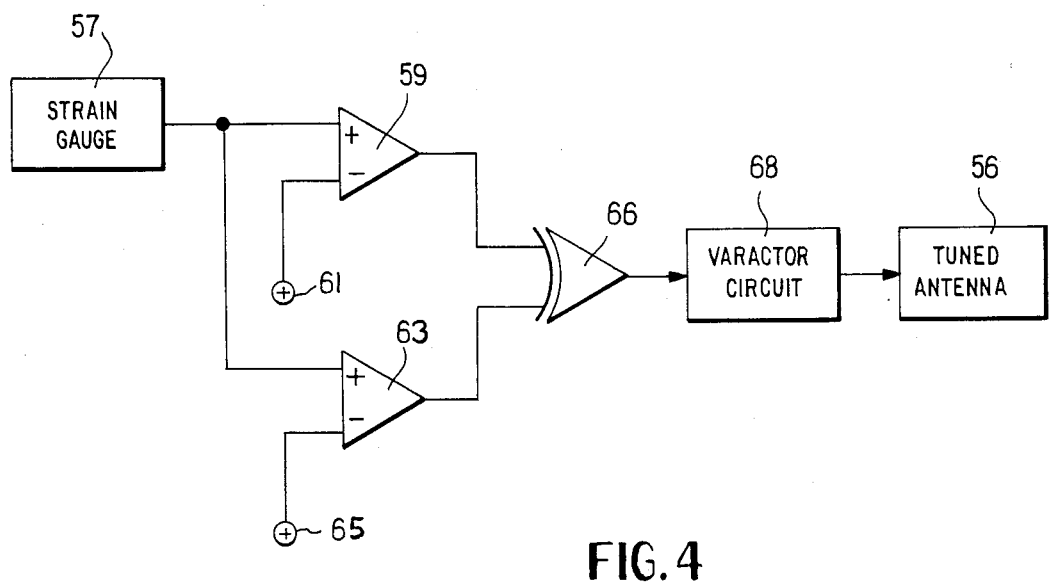
FIG. 4 is a block diagram of alternative tire monitoring circuitry which may be utilized in the system of FIG. 2.

Reference should now be made to FIG. 4, which illustrates circuitry for use with the system of FIG. 3 whereby a range of pressures including over pressure and under pressure at a tire may be sensed. In particular, the circuitry of FIG. 4 may be used in place of elements 58 and 60 of FIG. 3. An analog pressure sensing device such as a strain gauge 57 may be employed to provide an analog output signal, the amplitude of which is a function of the tire pressure. Preferred modes of employing an analog device such as a strain gauge are described hereinafter with respect to FIGS. 5 and 6. In FIG. 4, the strain gauge is connected to the + terminal of a comparator 59 while connected to the − terminal thereof is a reference voltage from a reference voltage source 61. Typically, if the pressure of a truck tire is being monitored, the tire pressure may normally be 80 pounds. Any pressure over 85 pounds would be considered a dangerous overinflated condition while any pressure under 65 pounds would be considered a dangerous underinflated condition. The reference voltage applied from source 61 may correspond to the overinflated condition of 85 pounds. The output of the strain gauge is also applied to the + terminal of a second comparator 63. Connected to the − terminal thereof is a reference voltage from a reference voltage source 65, this reference voltage corresponding to the lower limit of 65 pounds. The outputs of comparators 59 and 63 are applied as inputs to an exclusive OR circuit 66, the output of which is applied to a varactor or vari-cap circuit 68 to change the capacitance thereof and thus the impedance of tuned antenna 56. Again, the impedance of the antenna is substantially altered as is the case described above with respect to FIG. 3. Accordingly, the operation of the remainder of the circuit is as described with respect to FIG. 3.

With respect to the operation of the circuitry of FIG. 4, as long as the pressure is within the range of 65 to 85 pounds, the comparator 63 will transmit its high level input to exclusive OR circuit 66 while comparator 59 will transmit its low level output to circuit 66 thereby satisfying the conditions of the exclusive OR and hence operating varactor circuit 68 so that the frequency of the signal generated by oscillator 32 of FIG. 3 remains unchanged. However, if the pressure exceeds 85 pounds, both of the comparators 59 and 63 will transmit high level outputs to the exclusive OR circuit thereby changing the level of the signal applied to the varactor circuit 68 and thus the impedance of tuned antenna 56. The impedance of the antenna is also changed whenever the pressure decreases below 65 pounds since both the comparators 59 and 63 transmit their low level outputs to exclusive OR circuit 66 thereby again not fulfilling the conditions needed for providing a high level output from the exclusive OR circuit. Thus, the circuitry of FIG. 4 is particularly advantageous in that it provides a warning to the operator before a blow-out or the like occurs—that is, most blow-outs occur when the air pressure is beyond a safe range such as that discussed above and thus by providing an alarm to the operator as soon as this occurs, the possible occurrence of a blow-out can be avoided.

The strain gauge 57 may be of either the semiconductor, foil, or wire type. If of the semiconductor type it may be as described in the handbook "Semiconductor Circuit Elements" by T. D. Powers, et al., Hayden Book Company, Inc., Rochelle Park, N.J., 1975, pages 219 and 220. Further, the varactor circuit 68 may be as described at pages 223 through 232 of the foregoing handbook.

Referring to FIGS. 5 and 6 there are shown various methods of mounting the strain gauge 57 or the like of FIG. 4 with respect to a tire. Moreover, there are illustrated improved antenna configurations for use as the tuned antenna 56. Thus, in FIG. 5 there is shown the side view of the interior side of a tire—that is, the inside side of the tire which faces the vehicle body. Mounted on the wheel is a tire 72, typically of the tubeless type. A circular, loop antenna 74 is concentrically disposed with respect to the wheel including hub 71. The antenna is mounted with respect to the rim 75 of the wheel by a plurality of tabs 76, four of which are illustrated in the drawing. The tabs may be connected to the wheel rim in a manner similar to the manner by which lead weights are attached to a wheel rim to balance the wheel. As can best be seen in FIG. 6, the tabs include one end 73 which engages the interior surface of the rim 75, the other end of the tab being connected to the antenna 74. Typically a plastic sheath may be provided around the antenna and the tabs 76 may also be of plastic and integrally connected to the plastic sheath surrounding the antenna, the sheath being shown at 77 and the antenna per se at 79 in FIG. 6.

The loop antenna of FIG. 5 is particularly advantageous in that, due to its concentric mounting with respect to the wheel, there is no relative movement of the antenna with respect to the broadcast antenna. This is in contrast to a number of prior art devices where the antenna is located at a particular point along the periphery of the wheel, for example, at the valve stem, whereby the antenna is rotated about the center of the wheel when the vehicle is driven. Thus, the distance between the wheel antenna and the antenna at the central console varies introducing low frequency, spurious signals which can be difficult to remove. This problem with prior art antennas is avoided in the present invention by making the antenna concentric with the wheel whereby the distance remains the same regardless of how fast or slow the wheel rotates.

Reference should now be made to element 82 of FIG. 6 which may correspond, for example, to the circuitry of FIG. 4. This strain gauge circuit 82 is mounted to the inside wall of the tire and may be attached in place by a plug 84, the plug being a conventional plug for plugging holes in tubeless tires. Moreover, the circuit 82 may be mounted through a conventional, self-plugging hole in the tire and adhesively held in place. The gauge circuitry 82 is so mounted with respect to the interior wall of tire 72 so as to record changes in the inside wall curvature. Two wires 86 may extend through the plug 84 (or the self-plugging hole) to the terminals 87 and 89 of antenna 74 as can best be seen in FIG. 5. Alternatively, the tire and pass between the tire and the rim to the antenna. The strain gauge circuitry of FIG. 4 may be an integrated circuit on a semiconductor chip or the like. Moreover, the foregoing method of mounting a pressure monitoring circuit may be employed with respect to any type of pressure monitoring circuit whereby the circuit is mounted to the interior of the tire side wall and where the antenna is also disposed at the circuit and may extend through a plug or self-plugging hole. Although such an arrangement would be disadvantageous in that the antenna would be located at a particular point on the periphery of the wheel, as discussed above, the aforesaid method of mounting a pressure monitoring circuit is nevertheless particularly advantageous and may be effected without removing the tire from the vehicle to do so. That is, the vehicle may simply be raised on a rack or the like and each tire deflated to insert the pressure monitoring device or circuitry and then re-inflated. This provides an economical method for inserting such devices into tires which are presently mounted on the vehicle.

In operation, any change in pressure within tire 72 will be reflected in a change in the wall curvature and thus a signal will be transmitted to comparators 59 and 62 of FIG. 4. As long as the monitoring signal remains within the range established by the comparators, the reactance of the tuned circuit which includes varactor 68 and antenna 56 will remain unchanged. However, as discussed above, as soon as the monitoring signal goes outside the range, the capacity of tuned antenna 56 will be substantially changed to alert the operator of the dangerous condition.

The mounting of gauge device or circuitry 82 on the interior side of the inside wall of tire 72, as shown in FIG. 6, is preferable. However, other mountings of circuit 82 are also shown in dotted lines at 92 and 94. Thus, at 94, the gauge is shown mounted to the exterior surface of the outside wall of tire 72, the gauge being fastened to the tire with an adhesive. More preferably, the gauge when mounted to the exterior surface of a side wall would be mounted on the inside wall rather than the outside wall. However, for ease of illustration, it is shown as mounted on the outside wall at 94.

As shown at 92, the gauge may also be inserted between the tire 72 and rim 75 to hold it in place where an adhesive may also be used to attach the gauge to the side wall. Again, it would be preferable to insert the gauge between the inside wall of the tire and the rim, if this method of mounting the gauge is employed.

It should be noted that in all of the positions where the gauge is mounted, as illustrated in FIG. 6, none of these positions need be near the valve stem and, in fact, should be sufficiently removed from the valve stem to prevent any interference with the operation thereof. This is in contradistinction to many of the prior art devices where the pressure monitoring system is attached to or near the valve stem.

In another modification of the invention as illustrated in FIG. 6, gauge circuit 82 is connected to the metal belting 88 within the tire via a connection 90 which typically would extend along or within the inside wall of the tire. This would typically be effected during fabrication of the tire by the tire manufacturer. Since the metal belting is concentric with the wheel, it also would enjoy the advantages of antenna 74, as discussed above. Moreover, note at the dotted line 96 antenna 74 may also be placed on the outside of the wheel 70 although, as stated before, it is preferable the antenna be disposed at the inside of the wheel to provide it with more protection.

Figure 7:
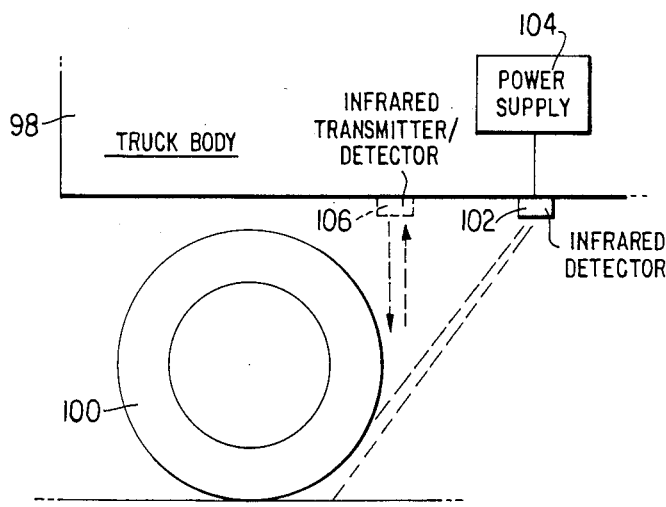
FIGS. 7 and 8 are schematic diagrams of an alternative tire monitoring device in accordance with a further aspect of the invention.
Figure 8:
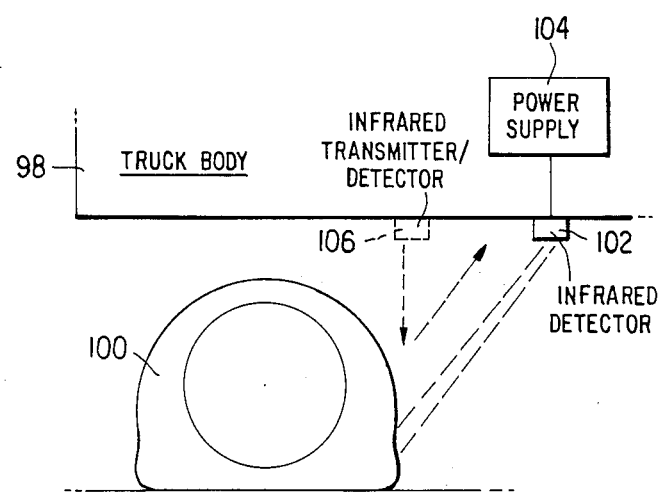

Reference should now be made to FIGS. 7 and 8 which illustrate further embodiments of the invention. First, it should be noted truck body 98 illustrated in these figures may be employed as the broadcast antenna shown in FIG. 2. Moreover, the chassis may also be employed as the broadcast antenna either by itself or in combination with the truck body or the body of any other vehicle in which the antenna is used.

Also illustrated in FIGS. 7 and 8 is an alternative method of monitoring the pressure within tire 100, this being effected by an infra-red detector 102 having a power supply 104. The power supply may be remotely energized in accordance with the circuitry of FIGS. 1 and 2. The infra-red detector has directivity and is directed to look at the load immediately in front of tire 100. As long as the tire is normally inflated, the amount of infra-red detected by detector 102 will be proportional to the type of road surface. However, whenever tire 100 becomes flat, as shown in FIG. 8, the detector 102 will sense infra-red radiations reflected from the tire and thus the level of the output signal from the detector will change. This change in the level of the output signal can be used to change the reactance of tuned antenna 56, for example of FIG. 2, to thus signal to the operator the existence of the flat tire and its location.

In an alternative embodiment, the detector 102 may initially be directed at the tire itself and, due to the curvature of the tire when it is normally inflated, a first level of infra-red would be detected by the detector. Upon a substantial change in the air pressure or the occurrence of a flat, the curvature of the tire would substantially change and thus the infra-red level detected by the detector would also change significantly to thus provide a signal which can be utilized at the central console to alert the operator.

In a further modification of the invention, an in-fra-red transmitter and detector 106 may be employed, this combination being similar to those used in cameras or the like for automatic focusing. In operation, transmitter 106 transmits infra-red radiation past the edge of the tire to the ground where the radiation is reflected back to the detector. When a substantial change in pressure occurs, the transmitted radiation reflects from the tire away from the detector and thus a change in level occurs in the sensed, reflected signal which can be utilized to alert the operator of a dangerous condition at the tire. Moreover, the transmitter/detector 106 may also be pointed directly at the tire such that the amount of reflected radiation would vary with a change in curvature of the tire to again provide an indication of a potentially dangerous or in-fact dangerous condition at the tire. It is possible to use other energy intensive media, such as ultra-sound, in this same way.

It is to be understood that the above detailed description of the various embodiments of the invention is provided by way of example only. Other embodiments of the invention include the use of the monitoring system of FIG. 2 for monitoring other conditions in addition to tire pressure. Moreover, the loop antenna embodiments of FIG. 5 may be used with any pressure monitoring device. Various other details of design and construction may be modified without departing from the true spirit and scope of the invention as set forth in the appended claims.

What is claimed is:

1. Tire pressure monitoring apparatus comprising:
   a tire pressure monitoring means including an energy detector disposed outside the tire and selected from the group consisting of an infra-red detector and an ultrasound detector, said energy detector having directivity such that the detector is normally pointed toward the ground so that detected energy normally passes by a point on the peripheral portion of the tire whereby if a significant change in the tire pressure occurs, the circumferential portion of the tire will be interposed in the said path the detected energy follows to thereby effect a substantial change in the level of said detected energy and thus detect said substantial change in the tire pressure; and means for transmitting a signal to a remote location representative of said substantial change in the tire pressure and for alerting of an operator thereof.

2. Apparatus as in claim 1 where said detector is disposed on the vehicle body.

3. Apparatus as in claim 1 where said detector is so disposed with respect to the tire that the detected energy travels vertically with respect to the ground.

4. Apparatus as in claim 1 including means for transmitting said energy over said path passing by the point on the circumference on the tire and where said detecting means is responsive to said waves transmitted by the transmitting means after they have been reflected from the ground when the tire pressure is normal or from said tire when said substantial change in pressure occurs.

5. A tire monitoring apparatus comprising;
broadcast means for generating a plurality of broadcast signals, each having a different frequency;
a plurality of tuned antennas respectively located at a plurality of tires of a vehicle where said tuned antennas are respectively responsive to said broadcast signals of different frequencies and where said broadcast means is remotely located from said plurality of tires;
a plurality of pressure monitoring means respectively located at said plurality of tires and respectively associated with said plurality of antennas such that, in response to the pressure at least one of said tires changing from a normal condition to an abnormal condition, the pressure monitoring means at that tire will change the loading on its associated tuned antenna to thus change a characteristic of the broadcast signal associated with the latter antenna from one level to another level;
a plurality of display means located at the remote location respectively associated with said plurality of tires such that one of said display means is responsive to said change in the characteristic of the broadcast signal associated with the latter antenna to thus alert an operator at the remote location that the pressure of said one tire has changed to an abnormal condition; and
where each of said pressure monitoring means comprises a binary switching means which switches from one state in response to said normal condition being monitored to another state in response to said abnormal condition being monitored and thus the loading on the associated antenna will switch from one state to another state whereby each of said tires is uniquely associated with one of the frequencies of the broadcast signals such that when said characteristic of one of said signals changes from said one level to said another level, not only is an abnormal condition displayed but also the tire at which the abnormal condition exists is indicated.

6. Apparatus as in claim 5 where said characteristic of the broadcast signal is the frequency thereof.

7. Apparatus as in claim 6 where said broadcast means includes means for sequentially generating said plurality of broadcast signals.

8. Apparatus as in claim 6 including at least one frequency discriminator for detecting the change in frequency of the broadcast signal.

9. Apparatus as in claim 5 where said characteristic of the broadcast signal is the amplitude thereof.

10. Apparatus as in claim 5 where said broadcast means includes at least one oscillator having at least one resonant circuit for generating said plurality of broadcast signals.

11. Apparatus as in claim 10 where said broadcast means includes a broadcast antenna and where the broadcast antenna and the tuned antennas each form at least a portion of said resonant circuit of the oscillator.

12. Apparatus as in claim 10 where said broadcast means includes a plurality of oscillators each having a resonant circuit for respectively generating said plurality of broadcast signals.

13. Apparatus as in claim 12 where said broadcast means includes a broadcast antenna and where the tuned antennas respectively form at least a portion of the resonant circuits of the oscillators and where said broadcast antenna also forms a portion of all said oscillators.

14. Apparatus as in claim 10 where said oscillator includes means for maintaining the output power thereof substantially constant.

15. Apparatus as in claim 5 where said tuned antenna includes a capacitor in circuit therewith and where said switching means is connected in circuit with said capacitor.

16. Apparatus as in claim 5, where said tuned antenna includes an antenna element having substantially inductive characteristics and a capacitor connected in parallel with the antenna such that the tuned antenna substantially comprises a tank circuit having a high impedance at its resonant frequency.

17. Apparatus as in claim 5 where said broadcast means includes a broadcast antenna where the latter antenna includes at least the vehicle chassis and/or body.

18. A pressure monitoring apparatus comprising:
monitoring means disposed at a vehicle tire for monitoring pressure in the tire;
broadcast means disposed at a remote location removed from the tire for transmitting by radio wave an electrical signal, said broadcast means including at least one oscillator at the remote location, the signal output of the oscillator having a predetermined characteristic;
a tuned antenna disposed at the tire having a predetermined impedance where said predetermined characteristic is a function of said impedance;
said monitoring means including changing means for changing the impedance of said tuned antenna, said changing means being responsive to a said predetermined characteristic of the signal output of the oscillator;
detecting means disposed at the remote location for detecting said change in said predetermined characteristic to thereby provide an alert signal; and
where said tire includes a valve stem, an outside side wall facing away from a vehicle body, an inside side wall facing toward the vehicle body and where each of said side walls has an exterior surface and an interior surface and where said tire pressure monitoring means is mounted on the interior surface of one of the side walls of said tire.

19. Apparatus as in claim 18 where said tire pressure monitoring means is a strain guage.

20. A pressure monitoring appratus comprising:
monitoring means disposed at a vehicle tire for monitoring pressure in the tire;

broadcast means disposed at a remote location removed from the tire for transmitting by radio wave an electrical signal, said broadcast means including at least one oscillator at the remote location, the signal output of the oscillator having a predetermined characteristic;

a tuned antenna disposed at the tire having a predetermined impedance where said predetermined characteristic is a function of said impedance;

said monitoring means including changing means for changing the impedance of said tuned antenna, said changing means being responsive to a substantial change in said pressure to thereby change said predetermined characteristic of the signal output of the oscillator;

detecting means disposed at the remote location for detecting said change in said predetermined characteristic to thereby provide an alert signal;

where said tire includes a valve stem, an outside side wall facing away from a vehicle body, an inside side wall facing toward the vehicle body and where each of said side walls has an exterior surface and an interior surface and where said tire pressure monitoring means is mounted on one of the side walls of said tire; and where said tire is mounted on a wheel having a pair of circumferential rims, one of said rims being on the side of said wheel facing away from the vehicle body and the other of said rims facing said vehicle body and where said tire pressure monitoring means is disposed between the exterior surface of said one wall and its corresponding wheel rim.

21. Apparatus as in claim 20 where said pressure monitoring means is mounted between the exterior surface of said inside side wall and said outer rim of the wheel.

22. A pressure monitoring apparatus comprising:

monitoring means disposed at a vehicle tire for monitoring pressure in the tire;

broadcast means disposed at a remote location removed from the tire for transmitting by radio wave an electrical signal, said broadcast means including at least one oscillator at the remote location, the signal output of the oscillator having a predetermined characteristic;

a tuned antenna disposed at the tire having a predetermined impedance where said predetermined characteristic is a function of said impedance;

said monitoring means including changing means for changing the impedance of said tuned antenna, said changing means being responsive to a substantial change in said pressure to thereby change said predetermined characteristic of the signal output of the oscillator;

detecting means disposed at the remote location for detecting said change in said predetermined characteristic to thereby provide an alert signal;

where said tire includes a valve stem, an outside side wall facing away from a vehicle body, an inside side wall facing toward the vehicle body and where each of said side walls has an exterior surface and an interior surface and where said tire pressure monitoring means is mounted on the interior surface adjacent to a self-plugging hole in said side wall; and where said antenna is disposed outside said tire and connected to said monitoring means by wires passing through said self-plugging hole.

23. A pressure monitoring apparatus comprising:

monitoring means disposed at a vehicle tire for monitoring pressure in the tire;

broadcast means disposed at a remote location removed from the tire for transmitting by radio wave an electrical signal, said broadcast means including at least one oscillator at the remote location, the signal output of the oscillator having a predetermined characteristic;

a tuned antenna disposed at the tire having a predetermined impedance where said predetermined characteristic is a function of said impedance;

said monitoring means including changing means for changing the impedance of said tuned antenna, said changing means being responsive to a substantial change in said pressure to thereby change said predetermined characteristic of the signal output of the oscillator;

detecting means disposed at the remote location for detecting said change in said predetermined characteristic to thereby provide an alert signal; and where said antenna is a loop antenna concentrically mounted outside the tire with respect to and spaced from one of the rims of the wheel.

24. Apparatus as in claim 23 where said antenna is mounted with respect to the rim of said wheel facing the vehicle body.

25. Apparatus as in claim 23 where said antenna is encapsulated in plastic.

* * * * *